United States Patent [19]
Willson

[11] 3,931,560
[45] Jan. 6, 1976

[54] MOTOR CONTROL SYSTEM AND ELECTRICAL SWITCH CONSTRUCTIONS THEREFOR OR THE LIKE

[75] Inventor: James R. Willson, Trumbull, Conn.

[73] Assignee: Robertshaw Controls Company, Richmond, Va.

[22] Filed: Nov. 9, 1973

[21] Appl. No.: 414,395

Related U.S. Application Data

[62] Division of Ser. No. 216,685, Jan. 10, 1972, Pat. No. 3,787,793.

[52] U.S. Cl. .............. 318/481; 318/452; 318/473; 307/118; 62/158
[51] Int. Cl.² ..................................... H02H 5/08
[58] Field of Search .................. 318/481, 473, 452; 307/118; 417/12; 62/158

[56] References Cited
UNITED STATES PATENTS

| | | | |
|---|---|---|---|
| 2,461,076 | 2/1949 | Neeson | 318/481 X |
| 2,749,495 | 6/1956 | Walley | 318/481 X |
| 2,981,195 | 4/1961 | Payne | 417/12 |
| 3,050,003 | 8/1962 | Edwards | 417/12 |
| 3,237,848 | 3/1966 | Pihl et al. | 318/481 X |
| 3,290,576 | 12/1966 | Jensen et al. | 318/481 X |
| 3,321,669 | 5/1967 | Rhodes | 318/473 X |

Primary Examiner—B. Dobeck
Attorney, Agent, or Firm—Candor, Candor & Tassone

[57] ABSTRACT

A control system for a motor having a required oil pressure for the safe operation thereof, the system having a time delay switch for interconnecting an electrical source to the motor to operate the same each time the time delay switch is initially activated by being placed across the power source. The time delay switch has a time delay bimetal means that is adapted to move and open the switch if the oil pressure of the motor does not reach the required value within a predetermined time period from the initial activation of the time delay switch. An oil pressure responsive switch is operatively interconnected to the time delay bimetal means and to the motor to terminate the switch opening movement of the time delay bimetal means if the oil pressure reaches the predetermined value thereof during the predetermined time period so that the motor will be continuously operated as long as the system is not manually or automatically turned off or the oil pressure does not fall below the predetermined value thereof.

3 Claims, 4 Drawing Figures

MOTOR CONTROL SYSTEM AND ELECTRICAL SWITCH CONSTRUCTIONS THEREFOR OR THE LIKE

This is a division of application Ser. No. 216,685, filed Jan. 10, 1972, now U.S. Pat. No. 3,787,793.

This invention relates to an improved control system for a motor to insure that the same has a required oil pressure therefor for safe operation thereof as well as to improved switch constructions for such a control system or the like.

It is well known that many motor systems require a sufficient oil pressure for the motor during the operation thereof so that such motor can properly function for its intended purpose. For example, such a motor can be the compressor motor of a refrigerating system or the like.

Accordingly, one of the features of this invention is to provide an improved control system for such a motor wherein the initial starting of the operation of the motor will only continue for a predetermined time period thereof and be automatically terminated at the end of such time period if the oil pressure of the thus operating motor does not reach a required oil pressure level for safe operation thereof.

Another feature of this invention is to provide a time delay switch means for accomplishing the above function with such switch means having a time delay bimetal means that is adapted to open the switch that interconnects the motor to an electrical power source if the oil pressure of the motor does not reach the required value within the predetermined time period from the initial activation of the switch to its on position.

Another feature of this invention is to provide an oil pressure responsive switch that is operatively interconnected to such time delay bimetal means and the motor to terminate the switch opening movement of the time delay bimetal means if the oil pressure reaches the predetermined value thereof during the predetermined time period.

In particular, one embodiment of this invention provides a control system for a motor having a required oil pressure for safe operation thereof, the system comprising an electrical power source and a time delay switch means having a switch for interconnecting the power source to the motor to operate the same each time the time delay switch means is initially activated by being placed across the power source. The switch means has a time delay bimetal means that is adapted to move and open the switch if the oil pressure of the motor does not reach the required value within the predetermined time period from the initial activation of the switch means. An oil pressure responsive switch is operatively interconnected to the time delay bimetal means and to the motor to terminate the switch opening movement of the time delay bimetal means if the oil pressure reaches the predetermined value thereof during the predetermined time period.

Such time delay bimetal switch means of this invention can comprise a frame means carrying two pairs of cooperating switch blades one of which when disposed in the closed position thereof will interconnect the motor to the power source and the other of which when in a closed condition thereof will interconnect a heater means of a first bimetal member across the power source to cause the first bimetal member to move from one position thereof where the same is holding the one pair of switch blades in an open condition thereof while being out of engagement with the other pair of said switch blades to another operating position thereof where the first bimetal member is out of engagement with the one pair of switch blades so that the same can be disposed in a closed position while holding the other pair of switch blades in an open condition thereof and thereby terminating that particular circuit for the heater means thereof. However, the aforementioned pressure responsive switch when closed by sensing the required oil pressure value for the motor will now complete a circuit through the heater means of the first bimetal member to maintain the same in its other position. A second bimetal member is carried by the frame means and upon the actuation of the electrical switch construction, a heater means thereof is energized to cause the second bimetal member to latch the other pair of switch blades in its open condition even though the oil pressure value may not reach its predetermined pressure value so that the entire system must be turned off and then turned on again in order to again attempt to start the motor.

The pressure operated switch construction of this invention can comprise a housing that is divided into two separate chambers, one of the chambers having an electrical switch therein adapted to be disposed in an open condition thereof or a closed condition thereof and the other chamber having a condition responsive means responsive to the oil pressure value of the motor. The condtion responsive means can comprise a bellows construction that expands upon an increase in the oil pressure value of the operating motor and can carry magnet means which when positioned a certain distance toward the switch chamber, will cause the switch means to be disposed in one of the opened or closed conditions thereof when the oil pressure value is above the required oil pressure value.

Accordingly, it is an object of this invention to provide an improved control system for a motor or the like, the control system having one or more of the novel features set forth above or hereinafter shown or described.

Another object of this invention is to provide improved electrical switch constructions for such a control system or the like.

Other objects, uses and advantages of this invention are apparent from a reading of this description, which proceeds with reference to the accompanying drawings forming a part thereof and wherein.

Figure 1:
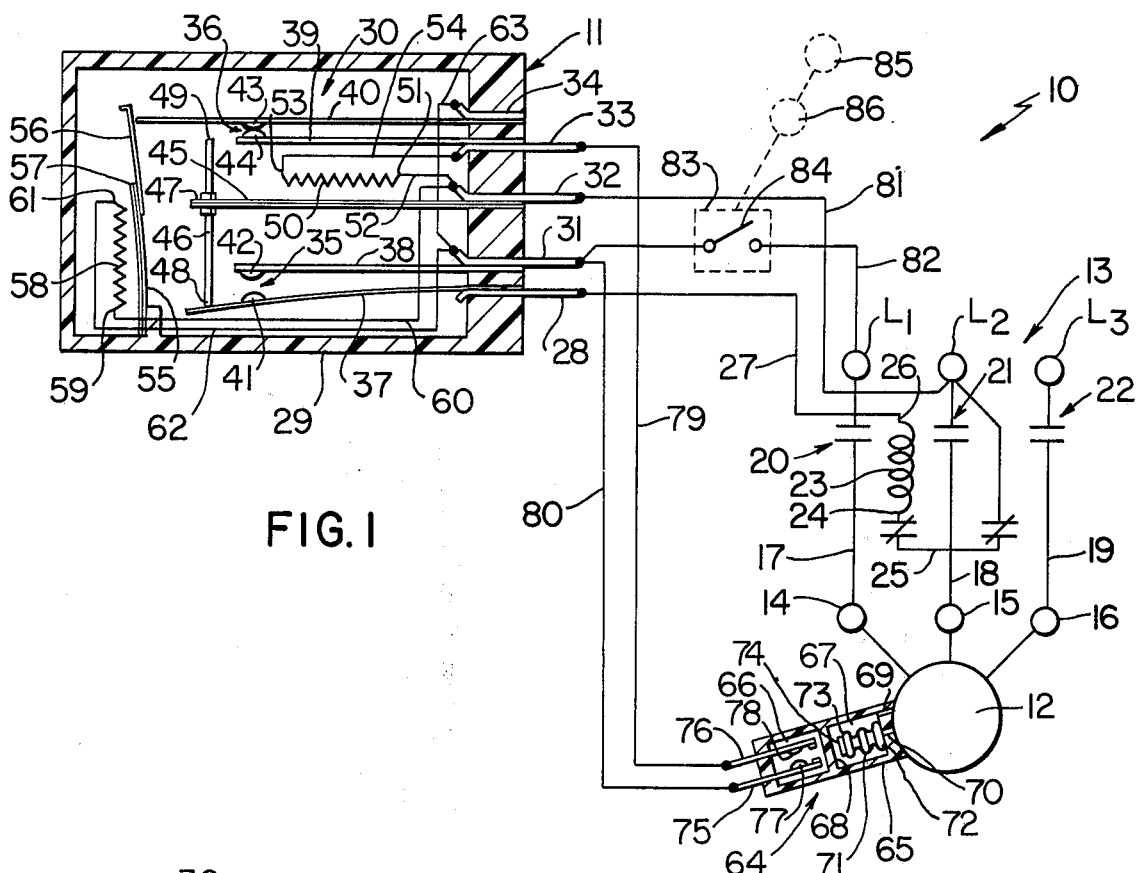
FIG. 1 is a schematic view illustrating the control system of this invention with the electrical switch constructions of this invention being shown in cross section.

While the various features of this invention are hereinafter described and illustrated as being particularly adapted to provide structure for the control system of a motor, it is to be understood that the various features of this invention can be utilized singly or in any combination thereof to provide structure for other control systems as desired.

Therefore, this invention is not to be limited to only the embodiment illustrated in the drawings, because the drawings are merely utilized to illustrate one of the wide variety of uses of this invention.

Referring now to FIG. 1, the improved motor control system of this invention is generally indicated by the reference numeral 10 and the improved switch constructions of this invention are generally indicated by the reference numerals 11 and 64, the control system 10 being utilized to control an electrically operated motor 12, such as a motor for operating the compressor of a refrigerating system, that requires that the oil pressure thereof be at a predetermined pressure value in order to insure safe operation of the motor 12. An electrical power source 13 is provided for the system 10 and comprises three power source lines L1, L2, and L3 for respectively being interconnected to terminals 14, 15, and 16 of the motor 12 through interconnecting leads 17, 18 and 19 having normally open contactor switches 20, 21 and 22 therein which are closed only when current flows through an operating winding 23 of the motor 12. The winding 23 has one side 24 thereof interconnected by a lead 25 to the power source lead L2. The other side 26 of the winding 23 is interconnected by a lead 27 to a terminal 28 of the electrical switch construction 11.

The electrical switch construction 11 comprises a sealed housing 29 having a chamber 30 formed therein and carrying not only the terminal 28, but also terminals 31, 32, 33 and 34 disposed in spaced parallel relation with the terminals 28, 31, 32 and 33 projecting exteriorally of the housing 29.

Two electrical switches 35 and 36 are provided in the housing 29 and are respectively formed by two pairs of cooperating switch blades 37, 38 and 39, 40 respectively carried in cantilevered fashion by the housing 29 and being respectively electrically interconnected to the terminals 28, 31, 33 and 34 as illustrated.

Figure 2:
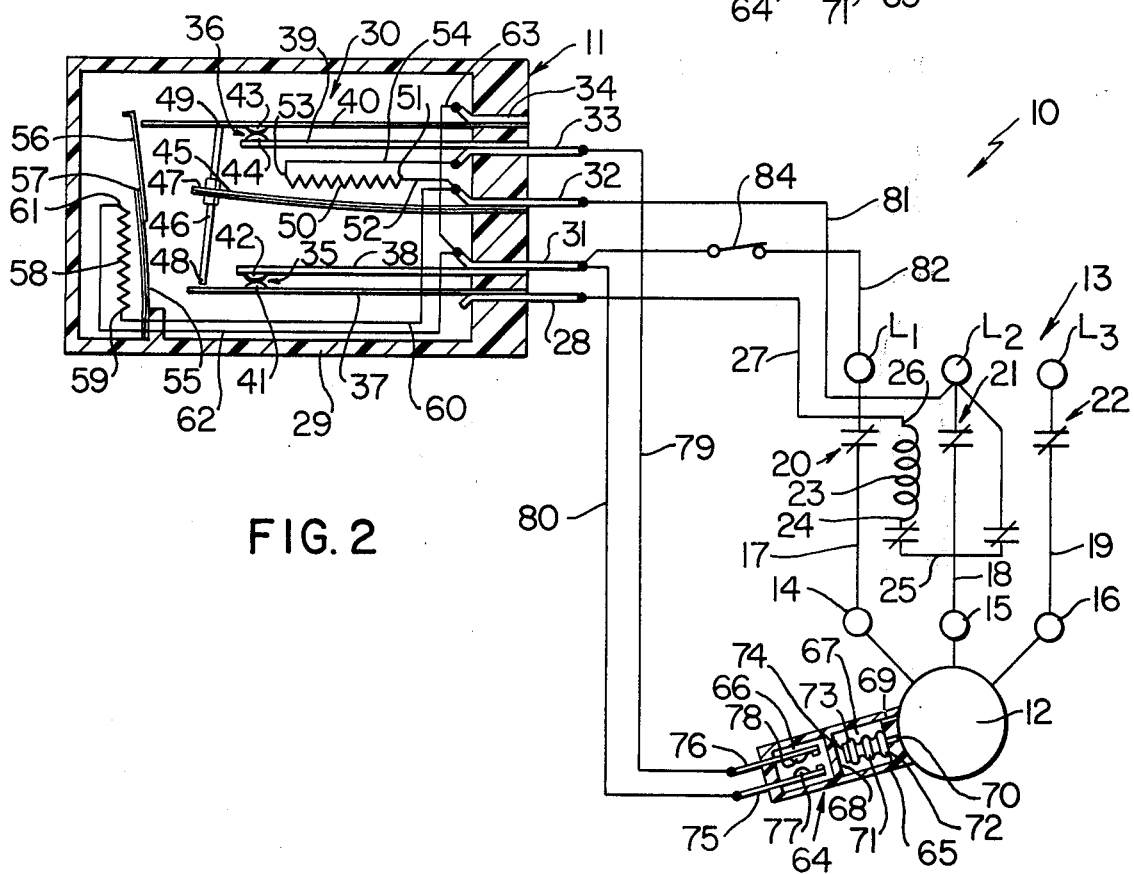
FIG. 2 is a view similar to FIG. 1 and illustrates the control system in one of its initial operating conditions.

The switch blade 38 of the switch 35 is substantially rigid while the switch blade 37 is substantially flexible and has a normal bias toward the switch blade 38 so that contacts 41 and 42 of the respective switch blades 37 and 38 normally tend to be disposed in electrical contact with each other as illustrated in FIG. 2. Similarly, the switch blade 39 of the switch 36 is substantially rigid while the switch blade 40 thereof is substantially flexible and has a normal bias toward the switch blade 39 so as to always tend to place its electrical contact 43 into electrical contact with a contact 44 of the switch blade 39 as illustrated in FIGS. 1 and 2.

A first bimetal member 45 is carried in cantilevered fashion by the housing 29 and is secured to the housing 29 at the same location as electrical terminal 32. An insulating rod or abutment means 46 is carried by the free end 47 of the bimetal member 45 and has opposed ends 48 and 49 disposed on opposite sides of the bimetal member 45 for respectively engaging against the switch blades 37 and 40 of the switches 35 and 36 for a purpose hereinafter described. However, when the bimetal member 45 is in a "cold" or normal ambient temperature condition thereof as illustrated in FIG. 1, the normal bias of the bimetal member 45 is the position illustrated in FIG. 1 where the abutment means 46 engages against the blade 37 of the switch 35 and holds the same out of electrical contact with the blade 38 so that the switch 35 is normally in an opened condition thereof. In this condition of the bimetal member 45, the abutment means 46 thereof is disposed out of contact with the blade 40 of the switch 36 so that the switch 36 is in a normally closed condition as illustrated in FIG. 1. However, when the bimetal member 45 is heated by an electrical current flowing through an electrical heater means 50 carried by the housing 29 adjacent the bimetal member 45, the heated bimetal member 45 warps upwardly as illustrated in FIG. 2 and causes the abutment means 46 thereof to engage against the switch blade 40 only after the same has moved away from the switch blade 37 of the switch 35 whereby the switch blade 37 makes electrical contact with the switch blade 38 to close the switch 35 as illustrated in FIG. 2 before the switch 36 is opened. The heated bimetal member 45 thereafter continues warping upwardly to engage against and move the switch blade 40 out of electrical contact with the switch blade 39 as illustrated in FIG. 2 whereby as long as the heater 50 remains energized, the bimetal member 45 will maintain the switch 35 in its closed condition and the switch 36 in its open condition as illustrated in FIG. 3 for a purpose hereinafter described.

The heater means 50 for the bimetal member 45 has one side 51 thereof interconnected to the terminal 32 by a lead 52 and the other side 53 thereof interconnected to the terminal 33 by a lead 54.

Figure 3:
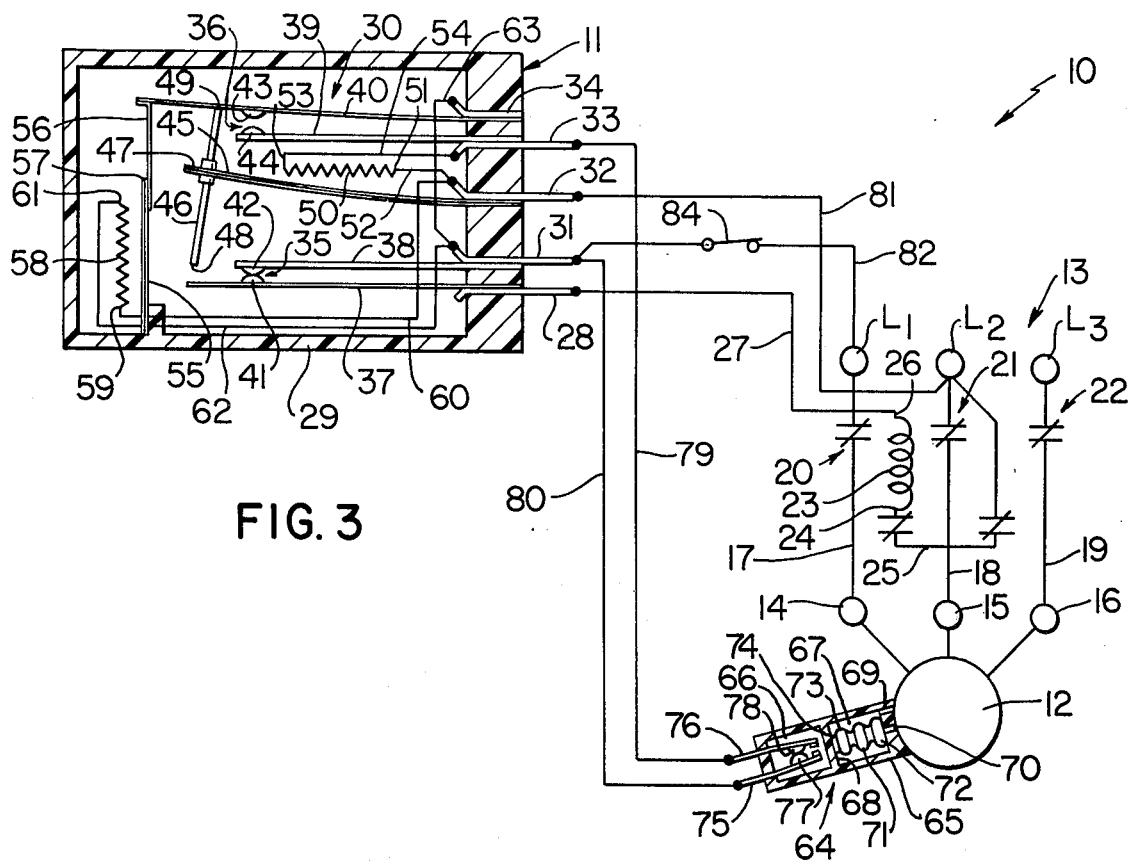
FIG. 3 is a view similar to FIG. 1 and illustrates the control system in its normal continuous operating condition.
Figure 4:
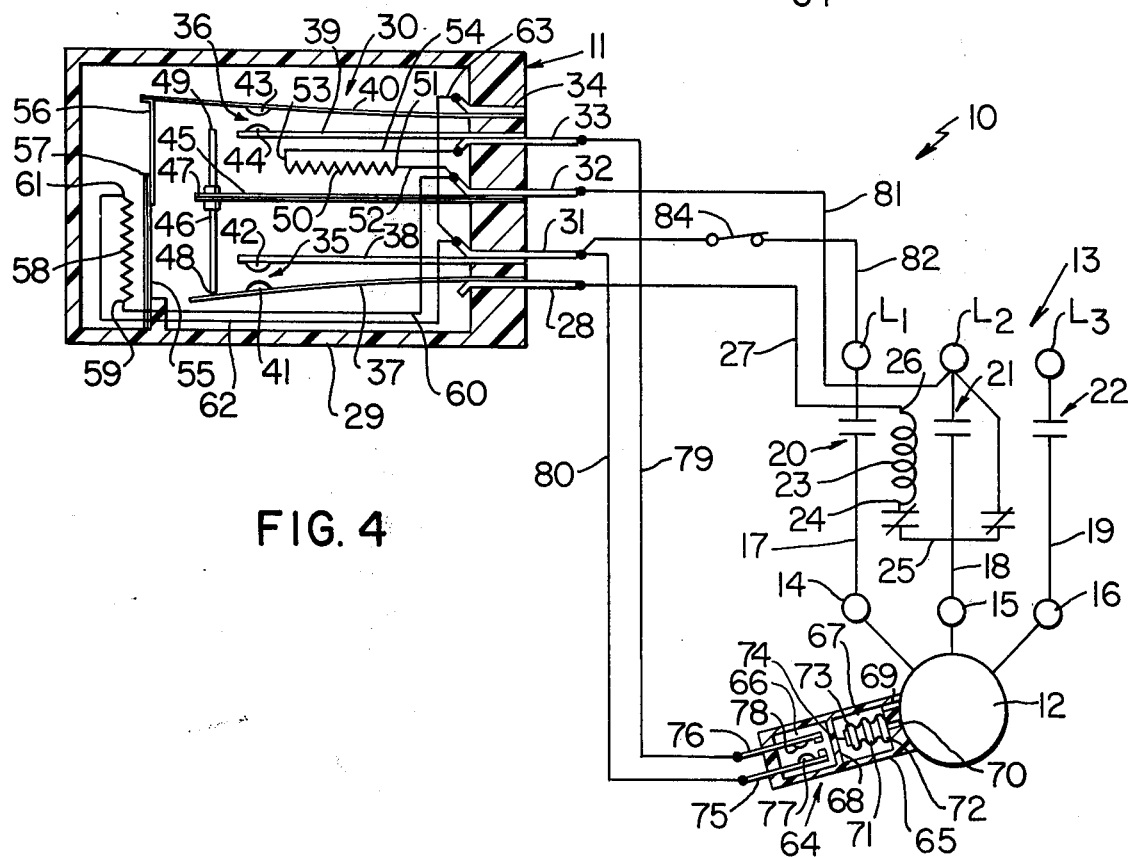
FIG. 4 is a view similar to FIG. 1 and illustrates the control system upon failure of the oil pressure value of the motor to reach the predetermined value within the predetermined time period following the initial activation of the control system.

A second bimetal member 55 is carried in cantilevered fashion by the housing 29 and has a spring latch member 56 carried at the free end 57 thereof for being disposed under the switch blade 40 when the same is in its open position as illustrated in FIG. 3 when the bimetal member 55 has been heated by an electrical heater means 58 also carried by the housing means 29. Thus, as long as the heater means 58 remains energized, the heater 58 maintains the bimetal member 55 in the warped condition illustrated in FIG. 3 to have the extension or latch member 56 thereof disposed under the switch blade 40 to hold the same in its open position should the bimetal member 45 which moved the switch blade 40 to its open condition subsequently warp away from the blade 40 as illustrated in FIG. 4. In this manner, it can be seen that it requires a deenergizing of the heater means 58 in order for the switch blade 40 to be unlatched from its open position to again cause closing of the switch 36 as illustrated in FIGS. 1 and 2.

The electrical heater 58 has the side 59 thereof interconnected by a lead 60 to the terminal 32 while the other side 61 of the heater 58 is interconnected by a lead 62 to the terminal 31, the terminal 31 also being electrically interconnected by a lead 63 to the terminal 34.

The pressure responsive switch construction 64 of this invention is provided for the system 10 and includes a housing means 65 having two chambers 66 and 67 formed therein and separated from each other by an inner wall 68 so that the chambers 66 and 67 are completely sealed from each other. The housing 65 can be carried by the motor 12 and has the chamber 67 thereof interconnected to the low pressure side of the oil compartment means of the motor 12 by a passage 69 while the high pressure side of the oil compartment for the motor 12 is interconnected to a passage 70 in the housing 65 that leads to the interior of a bellows construction 71 having one end 72 fastened to the housing 65 and the other end 73 projecting into the chamber 67 and carrying a magnet or magnet armature 74 on the free end 73 thereof.

A pair of switch blades 75 and 76 respectively project into the chamber 66 of the housing 65 and carry contacts 77 and 78 which are adapted to cooperate with each other when the switch blades 75 and 76 are moved together under the magnet force produced by the magnet 74 when the magnet 74 is disposed against the wall 68 as illustrated in FIG. 3. Thus, the bellows construction 71 must expand through an increase in the pressure differential acting across the same to cause the movable end 73 thereof to move toward the wall 68 and have the magnet 74 engaged thereagainst in order for the magnet 74 to have an influence on the switch blades 75 and 76 to cause closing of the switch blades 75 and 76 and, thus, closing of the pressure responsive switch construction 64. However, the bellows 73 is only expanded against the wall 68 to cause closing of the switch blades 75 and 76 when the oil pressure reaches the predetermined pressure value for safe operation of the motor 12. As long as the pressure value of the oil for the motor 12 is below such required pressure value, the bellows 71 cannot expand in opposition to the natural collapsing bias of the bellows 71 close enough to the wall 68 to have the magnet 74 cause closing of the switch blades 75 and 76. Thus, as long as the pressure value of the oil for the motor 12 is below the predetermined value, the switch blades 75 and 76 are disposed in an open condition thereof.

The terminal 33 of the switch construction 11 is interconnected by the lead 79 to the switch blade 76 of the pressure responsive switch 64. The other switch blade 75 of the pressure responsive switch 64 is interconnected by a lead 80 to the terminal 31 of the switch construction 11.

The terminal 32 of the switch construction 11 is interconnected by the lead 81 to the power source lead L2.

The power source lead L1 is interconnected to the terminal 31 of the switch construction 11 by the lead 82, the lead 82 having an operating control 83 disposed therein that includes a switching means 84 for opening and closing the line 82. The control means 83 can be initially moved to a closed condition by an operator manually actuating an on-off switch means 85 of the system 10 to cause closing of the switch blade 84 as illustrated in FIG. 2 and the control means 83 can also be under the control of a thermostatic means 86 which is utilized for automatically controlling the motor 12 in performing its function, such as operating a compressor in a refrigerating system. Thus, as long as the thermostat 86 demands that the motor 12 be operating, the thermostatic means 86 will tend to maintain the switch blade 84 in its closed condition when the manual control 85 is in an on position thereof. However, if the motor 12 is operating and the thermostatic means 86 should subsequently determine that the motor 12 should cease operating, the thermostatic means 86 will open the switch blade 84 until the thermostatic means 86 again determines that the motor 12 should be operating.

The operation of the control system 10 and switch constructions 11 and 64 as utilized therein will now be described.

As illustrated in FIG. 1, the control means 83 has its switch blade 84 disposed in the open position because the on-off control 85 is in its "off" position and the bimetal members 45 and 55 are in their "cool" or ambient temperature conditions. Thus, the latching bimetal member 55 is to the left of the switch blade 40 and the bimetal member 45 has its abutment means 46 maintaining the switch 35 in its open condition. Also, since the motor 12 is not operating, the pressure responsive switch 64 is in its open condition.

When the operator initially turns on the system 10 by operating the means 85 to its "on" position to cause the control means 83 to move the switch blade 84 to its closed position as illustrated in FIG. 2, the heater element 58 for the bimetal member 55 is placed across the power source leads L1 and L2 by way of lead 82, switch blade 84, terminal 31, lead 62, heater 58, lead 60, terminal 32 and lead 81 whereby such heater means 58 begins to heat the bimetal member 55 and cause the same to tend to warp to the right in the drawings.

The heating element 50 for the bimetal member 45 is also initially energized by being placed across the power source leads L1 and L2 through lead 82, closed switch blade 84, terminal 31, lead 63, terminal 34, switch blade 40, switch blade 39, terminal 33, lead 54, heater 50, lead 52, terminal 32 and lead 81.

The thus energized heater 50 heats the bimetal member 45 and as the temperature of the heated bimetal member 45 increases, the bimetal member 45 flexes or warps upwardly carrying the abutment means 46 therewith. As the abutment means 46 is moving upwardly, the switch blade 37 of the switch 35 follows the abutment means 46 until the contact 41 of the switch blade 37 is placed into contact with the contact 42 of the switch blade 38 to cause closing of the switch 35 as illustrated in FIG. 2. This closing of the switch 35 takes place before the abutment means 46 makes contact with the switch blade 40 of the switch 36 whereby, as illustrated in FIG. 2, both switch means 35 and 36 are disposed in their closed positions. The closing of the contacts 41 and 42 of the switch 35 now places the winding 23 of the motor contactor across the power source leads L1 and L2 by way of lead 82, closed switch blade 84, terminal 31, switch blade 38, switch blade 37, terminal 28, lead 27, coil 23 and lead 25. This energizing of the winding 23 causes the contact means 20, 21 and 22 to close whereby the power source leads L1, L2 and L3 are respectively interconnected to the terminals 14, 15 and 16 of the motor 12 and place it into operation.

The bimetal member 45 continues to warp upwardly from the position illustrated in FIG. 2 due to the heating thereof by the heater 50 and causes the abutment means 46 thereof to abut against the switch blade 40 and move the same upwardly to the position illustrated in FIG. 3 and thereby open the switch 36. During this upward warping of the bimetal member 45, the heater means 58 for the bimetal member 55 has caused the bimetal member 55 to warp or flex to the right in FIG. 3 and carry the spring element or latch member 56 therewith with the length of the latch member 56 being such that as the switch blade 40 is being carried upwardly by the abutment means 46 of the bimetal member 45 to open the switch 36, the upper end of the latch member 56 is positioned beneath the blade 40 to prevent the blade 40 from thereafter moving downwardly should the element 46 of the bimetal member 45 subsequently move downwardly by failure of the pressure switch 64 to close during such upward movement of the bimetal member 45 after the switch means 35 has been closed to initial operate the motor 12.

With the opening of the switch 36 by the bimetal member 45 moving upwardly, the circuit through the heater means 50 for the bimetal member 45 has been terminated so that should the pressure responsive switch 64 remain in its open condition, due to the fact that the oil pressure in the motor system 12 has not increased to the required predetermined value thereof, the bimetal member 45 begins to cool because the heater 50 is no longer energized and will start a downward warping movement. During such downward movement of the bimetal member 45 from the position illustrated in FIG. 3 toward the position illustrated in FIG. 4, the compressor motor 12 remains energized so it is still possible for the oil pressure therein to develop to a sufficient value to close the switch 64 to reenergize the heater 50 and thereby cause the bimetal member 45 to move back upwardly before the same has moved downwardly a sufficient distance to open the switch 35. Alternately, the oil pressure of the system 10 may have developed to a sufficient value to cause the pressure responsive switch 64 to close the contact blades 75 and 76 prior to the initial opening of the switch 36 by the bimetal member 45 and such closing of the switch 64 will maintain or place the heater 50 across the power source leads L1 and L2 because the pressure responsive switch 64 is in parallel with the contacts 43 and 44 of the switch 36. For example, the heater 50 for the bimetal member 45 is placed across the power source leads L2 and L1 by way of lead 81, terminal 32, lead 52, heater 50, lead 54, terminal 33, lead 79, closed contact blades 76 and 75, lead 80, terminal 31 and lead 82 through closed switch blade 84 when the pressure responsive switch construction 64 is closed.

However, in the event that the oil pressure of the motor means 12 has not caused the pressure responsive switch 64 to close prior to the initial opening of the contacts 43 and 44 of the switch 36 due to the upward movement of the bimetal member 45 and the pressure responsive switch 64 does not close during the downward movement of the bimetal member 45 caused by the deenergizing of the heater 50 upon opening of the contacts 44 and 43, the abutment means 46 of the cooling bimetal member 45 will carry the switch blade 37 of the switch 35 downwardly opening the contacts 41 and 42 of the switch 35 as illustrated in FIG. 4. The opening of the switch 35 thus causes the contact winding 23 for the motor 12 to be deenergized to open the contact switches 20, 21 and 22 to terminate the operation of the motor 12. Since the operating control 83 for the system 10 remains closed, the heater 58 for the bimetal member 55 remains energized so that the switch 36 remains latched in its open condition as illustrated in FIG. 4. Such a situation would also exist following the opening of the pressure responsive switch 64 during a successful prior operation of the motor means 12 because the pressure responsive switch 64 may subsequently open due to a loss of oil pressure due through a malfunction in the motor means 12.

Under the conditions of FIG. 4, it can be seen that the system 10 is locked out and it is necessary to open the switch blade 84 of the control 83 by moving the actuation 85 to its "off" position in order to cause the heater 58 of the bimetal member 55 to be deenergized so that the subsequent cooling of the bimetal member 55 will warp the same to the left and permit the unlatching of the switch blade 40 so that the same can return to the position illustrated in FIG. 1. With the system 10 now returned to the condition illustrated in FIG. 1, the operation of the system 10 can then be again attempted by causing the closing of the switch 84 of the controller 83 to once again place the time delay switch device 11 in operation in the manner previously described.

Once the system 10 has been placed in operation and the proper oil pressure is being maintained at the motor means 12 to maintain the switch 64 in the closed position thereof, the time delay switch device 11 will be cycled in accordance with the opening and closing of the switch 84 for the control means 83 under the influence of the thermostat 86. Thus, if the system 10 has been placed in operation to position the time delay switch construction 11 in the condition shown in FIG. 3, the system will continue to operate until the temperature demand being sensed by the thermostat 86 has been satisfied whereby the switch blade 84 of the control 83 will automatically open causing the power to the heater means 58 to be terminated and will open the circuit to the contactor winding 23 to terminate the operation of the motor 12. The termination of the operation of the motor 12 will of course cause a loss of oil pressure and consequently the opening of the oil pressure switch 64 so that the heater 50 for the bimetal member 45 is deenergized allowing the bimetal member 45 to cool and move downwardly to open the contacts 41 and 42 of the switch 35. The deenergizing of the heater 58 for the bimetal member 55 causes the bimetal member 55 to warp to the left and permit the switch blade 40 to move downwardly and close the contacts 43 and 44 of the switch 36 whereby the system 10 will return to the position illustrated in FIG. 1. When the switch blade 84 of the control 83 is again closed by the thermostat 86 now sensing a demand for the motor means 12 to be operated, the heaters 58 and 50 for the bimetal members 55 and 45 are again energized in the manner previously described to begin the time delay period provided by the time delay switch 11 whereby the operation of the time delay switch 11 is the same as has been previously described and will permit operation of the motor 12 provided the oil pressure is developed to the predetermined pressure value to cause the switch 64 to close during the time delay period provided by the switching device 11.

Thus, it can be seen that the time delay device 11 provides the predetermined time period that the motor means 12 will be operated to cause its oil pressure to reach the predetermined safe value thereof as being the time period that the bimetal member 45 moves upwardly from the position illustrated in FIG. 1 through a heating thereof and then moves downwardly from the position illustrated in FIG. 3 to the position illustrated in FIG. 4 through the cooling thereof before the attempt to start the system 10 has been terminated and requires another start attempt therefor.

While it can be seen that there are many advantages of the above-described system 10 and the parts thereof, the aforementioned full cycle time delay utilizes both the heating and cooling cycles of the bimetal member 45 during the timing sequence whereby this feature is believed to make it easier to control longer delay periods. The full cycle time delay is believed to also make the device less subject to temperature and voltage variations. Another advantage of the full cycle time delay is that no delay time is required between timing cycles so this should simplify timer checking and thus reduce costs.

The remote differential pressure sensor 64 for the motor 12 consists of a simple bellows in an enclosure and a sealed, magnetically operated switch outside of the enclosure. Thus, it is believed that the pressure responsive switch 64 is a simple and reliable device and has the advantage that the switch 64 is only required to carry bimetal heater current of about 5 watts and it is never required to "make" this current and it will almost never break it.

The bimetal 45 and heater 50 of the switch device 11 integrate signals from the pressure sensor switch 64 so that the switch snap action is not critical and will not be adversely influenced by vibration. The bellows 71 for the pressure responsive switch 64 can be stopped against the wall 68 of the housing 65 for over pressure protection so that the stop wall 68 for the bellows 71 will help to make the bellows 71 less subject to vibrations.

The whole system of the pressure responsive switch 64, as well as the time delay switch 11, are hermetically sealed so that the switch 64 can be submerged in water along with the compressor motor 12.

Some of the overall advantages of the system characteristics of this invention are believed to be that the system will be low in cost, loose connections or broken wires will interrupt motor current so that the same is fail-safe, the bimetals do their work in a closed movement direction to avoid creep, reset is accomplished by interrupting current whereby this makes it possible to reset either at the control panel or at some remote location, the timing relay 11 gives an approximately 15 second delay before energizing the motor contactor 23 whereby this will help to eliminate control dial "twiddling" as a problem and the two-part system should make installation easier.

From the above, it can be seen that this invention not only provides an improved motor control system, but also this invention provides improved switch means for such a control system or the like.

While the form of the invention now preferred has been disclosed as required by the patent statutes, other forms may be utilized, all coming within the scope of the appended claims.

What is claimed is:

1. A control system for a motor having a required oil pressure value for safe operation thereof comprising an electrical power source, a time delay switch means having a switch for interconnecting said source to said motor to operate the same each time said switch means is initially activated by being placed across said power source, said switch means having a time delay bimetal means that is adapted to move and open said switch if said oil pressure of said motor does not reach said required value within a predetermined time period from the initial activation of said switch means, and an oil pressure responsive switch operatively interconnected to said time delay bitmetal means and said motor to terminate the switch opening movement of said time delay bimetal means if said oil pressure reaches said predetermined value thereof during said predetermined time period, said bimetal means comprising a bimetal member and an electrical heater for heating said bimetal member when said heater is operatively interconnected to said power source, said pressure responsive switch terminating said switch opening movement of said bimetal member by continuously interconnecting said power source to said heater as long as said oil pressure is above said predetermined value, said switch means having means for initially interconnecting said heater to said power source when said switch means is initially activated by being placed across said power source whereby the energized heater causes movement of said bimetal member and, thus, the start of said predetermined time period, said switch means having a first switch for interconnecting said power source to said motor, said bimetal member opening said first switch when at ambient temperature and closing said first switch when being heated by said heater, said switch means having a second switch that initially interconnects said power source to said heater when closed and disconnects said heater from said power source when opened, said bimetal member opening said second switch when heated to a certain amount by said heater.

2. A control system as set forth in claim 1 wherein latch means is provided for said switch means which latches said second switch in the open position thereof when said second switch is opened by said bimetal member.

3. A control system as set forth in claim 2 wherein said latch means comprises another bimetal member and an electrical heater therefor.

* * * * *